US008145389B2

(12) United States Patent
Kobayashi et al.

(10) Patent No.: US 8,145,389 B2
(45) Date of Patent: Mar. 27, 2012

(54) DRIVING ASSISTING SYSTEM, METHOD AND VEHICLE INCORPORATING THE SYSTEM

(75) Inventors: Yosuke Kobayashi, Yokohama (JP);
Takeshi Kimura, Yokohama (JP);
Genpei Naito, Yokohama (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 978 days.

(21) Appl. No.: 11/295,699

(22) Filed: Dec. 7, 2005

(65) Prior Publication Data
US 2006/0195245 A1 Aug. 31, 2006

(30) Foreign Application Priority Data
Dec. 7, 2004 (JP) ................ P2004-353997

(51) Int. Cl.
*G06F 7/00* (2006.01)
(52) U.S. Cl. ............... 701/49; 701/36; 701/70; 701/93; 701/96; 701/301; 340/435
(58) Field of Classification Search ............. 701/1, 301, 701/70, 71, 75, 76, 79, 93, 103, 105, 110, 701/36, 49, 96; 340/438, 439, 903, 441, 340/467, 435
See application file for complete search history.

(56) References Cited

U.S. PATENT DOCUMENTS

| 4,333,146 A * | 6/1982 | Sinha et al. ............ 701/76 |
| 5,123,301 A * | 6/1992 | Hagele et al. ........... 477/121 |
| 6,226,593 B1 * | 5/2001 | Kurz et al. ............. 701/301 |
| 6,259,992 B1 | 7/2001 | Urai et al. |
| 7,155,342 B2 * | 12/2006 | Kobayashi et al. ........ 701/301 |
| 7,425,043 B2 * | 9/2008 | Doerr et al. ............ 303/193 |
| 2003/0135317 A1 | 7/2003 | Hijikata et al. |
| 2003/0176960 A1 | 9/2003 | Yamamura |
| 2003/0233187 A1 * | 12/2003 | Egami ................ 701/96 |
| 2004/0195022 A1 | 10/2004 | Inoue |
| 2005/0222742 A1 | 10/2005 | Yamamura |

FOREIGN PATENT DOCUMENTS

| EP | 1 327 552 A2 | | 7/2003 |
| EP | 1 346 892 A2 | | 9/2003 |
| EP | 1 442 916 A1 | | 8/2004 |
| GB | 2 393 527 A | | 3/2004 |
| JP | 01095946 A | * | 4/1989 |
| JP | 2004-67070 A | | 3/2004 |
| WO | WO 2004/028847 | * | 4/2004 |

OTHER PUBLICATIONS

U.S. Appl. No. 11/142,479, filed Jun. 2, 2005.
European Search Report issued in corresponding European Patent Application No. EP 05 02 6507, dated Sep. 18, 2006.

* cited by examiner

*Primary Examiner* — Khoi Tran
*Assistant Examiner* — Spencer Patton
(74) *Attorney, Agent, or Firm* — McDermott Will & Emery LLP

(57) ABSTRACT

A system for assisting an operator in driving a vehicle. The system calculates risk potential associated with the vehicle. Responsive to an acceleration command issued by the operator via an operator-controlled input device to perform an intended acceleration operation, the system conveys information related to the calculated risk potential by modifying a relationship of an amount of acceleration corresponding to an operation amount of the operator-controlled input device, based on the calculated risk potential.

4 Claims, 18 Drawing Sheets

DRIVING ASSISTING SYSTEM, METHOD AND VEHICLE INCORPORATING THE SYSTEM

RELATED APPLICATION

This application claims the benefit of priority from Japanese Patent Application No. 2004-353997, filed Dec. 7, 2004, the disclosure of which is hereby incorporated by reference in its entirety.

FIELD OF THE DISCLOSURE

This disclosure relates to a system and method for assisting an operator in driving a motor vehicle, and more specifically, to driving assisting system and method that convey information related to risk potential by altering a relationship of an amount of acceleration corresponding to an operation amount, based on the risk potential.

BACKGROUND OF THE DISCLOSURE

JP2004-67070A discloses a driving operation assisting system, which transmits information related to an environment surrounding a vehicle to an operator by deceleration, as well as by varying a reaction force applied to an accelerator pedal based on different values of risk potential. This type of system increases the amount of deceleration and accelerator pedal reaction force in view of an increase in risk potential. However, the increased accelerator pedal reaction force and vehicle deceleration impair the response of the vehicle to a proper acceleration intended by the operator. Accordingly, there is a need for a driving operation assisting system that transmits information related to an environment surrounding the vehicle without impairing an intended acceleration by the operator.

SUMMARY OF THE DISCLOSURE

This disclosure describes various exemplary methods and systems that convey information related to risk potential by altering a relationship of an amount of acceleration corresponding to an operation amount of an operator-controlled input device, such as an accelerator pedal, based on the risk potential.

An exemplary system calculates risk potential associated with a vehicle. Responsive to an acceleration command issued by the operator of the vehicle via an operator-controlled input device to perform an intended acceleration operation, the system conveys information related to the calculated risk potential by modifying a relationship of an amount of acceleration corresponding to an operation amount of the operator-controlled input device, based on the calculated risk potential. In one aspect, the amount of acceleration corresponding to the operation amount of the operator-controlled input device is reduced. The system may further transmit the information related to the calculated risk potential by modifying a reaction force applied to the operator-controlled input device, based on the calculated risk potential.

According to one embodiment, conveyance of the information related to the calculated risk potential is initiated subsequent to performing the intended acceleration operation. In one aspect, subsequent to performing the intended acceleration operation, the amount of acceleration corresponding to the operation amount of the operator-controlled input device is reduced.

A vehicle may be equipped with an exemplary system as disclosed herein to assist a driver in operating the vehicle.

According to an exemplary method of this disclosure, risk potential associated with a vehicle is calculated. Responsive to an acceleration command issued by an operator of a vehicle via an operator-controlled input device to perform an intended acceleration operation, information related to the calculated risk potential is conveyed to the operator by modifying a relationship of an amount of acceleration corresponding to an operation amount of the operator-controlled input device, based on the calculated risk potential.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

DETAILED DESCRIPTION OF THE PREFERRED EMBODIMENTS

Various exemplary embodiments according to the present disclosure are described hereunder in detail with suitable reference to the accompanying drawings.

First Exemplary Embodiment

Referring to FIGS. 1 to 19 of the accompanying drawings, the following sections provide descriptions of an exemplary system and method for assisting an operator in driving a vehicle.

Figure 1:
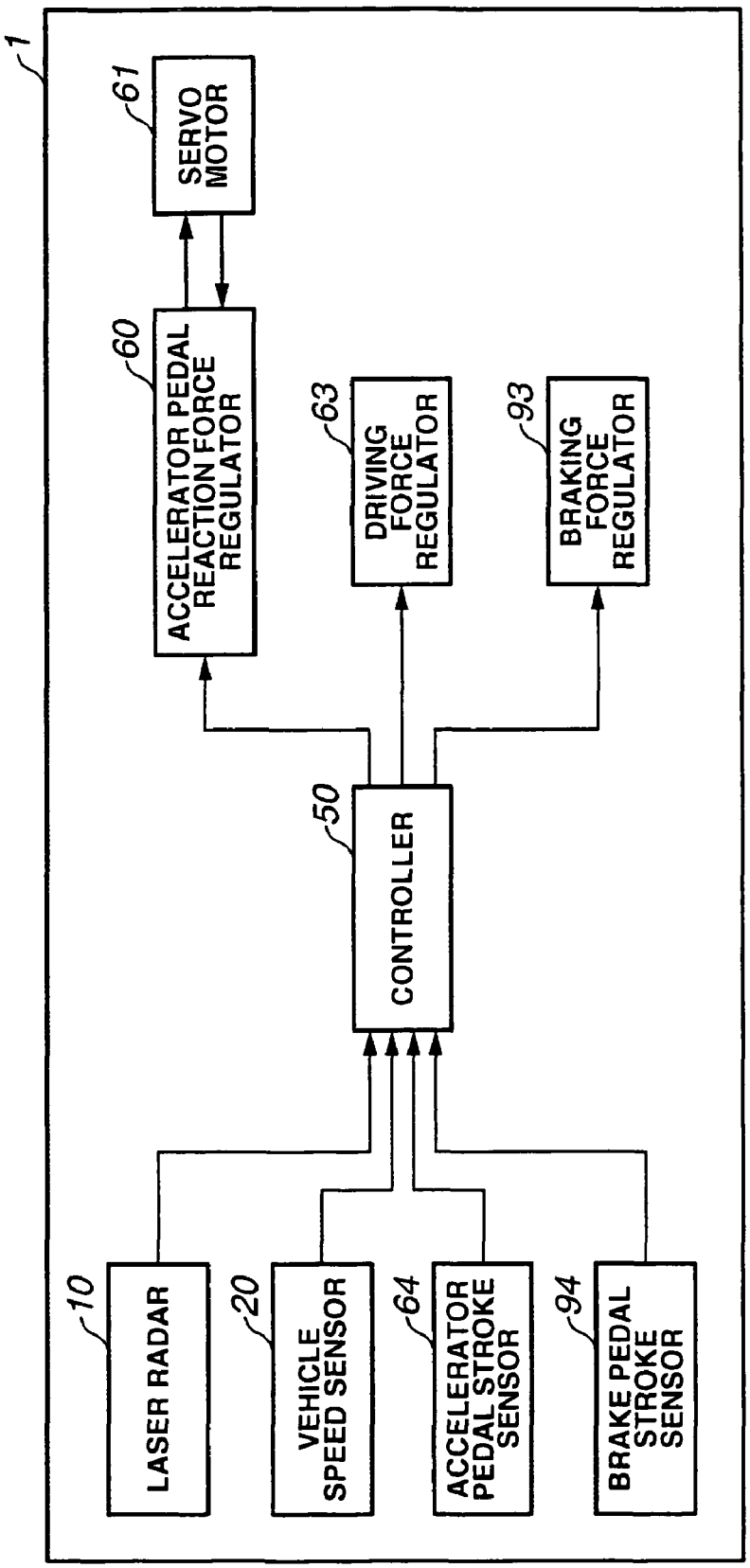
FIG. 1 is a block diagram illustrating a first exemplary embodiment of a system for assisting an operator in driving a vehicle according to the present disclosure.
Figure 2:
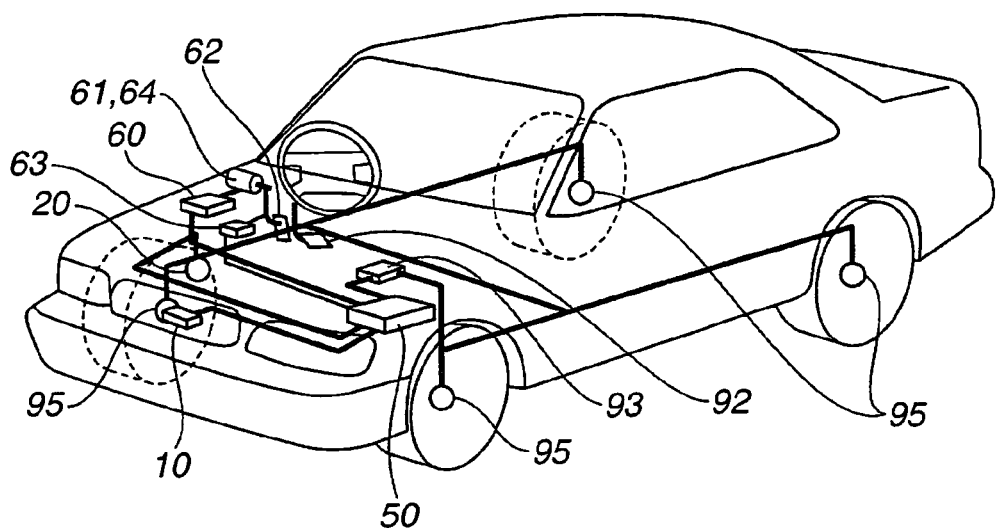
FIG. 2 is a perspective view of a motor vehicle installed with the driving operation assisting system shown in FIG. 1.

In FIG. 1, the reference numeral 1 designates a system for assisting an operator in driving a vehicle, i.e., an own vehicle shown in FIG. 2. The driving operation assisting system 1 includes elements described below.

Laser radar 10 is attached to a front grille or a front bumper of the own vehicle. The laser radar 10 scans a region in front of the own vehicle by sending out infrared pulses in the horizontal direction. The laser radar 10 measures reflected waves of the infrared pulses by a plurality of reflectors in front of the own vehicle. In situations under consideration, the plurality of reflectors in front of the own vehicle are rear ends of a plurality of preceding vehicles ahead. The infrared pulses are reflected by the rear ends of the preceding vehicles and the laser radar 10 measures the reflected waves. After measuring the reflected waves, the laser radar 10 detects distances to the preceding vehicles from the own vehicle based on a respective arrival time of each of the waves and directions from the own vehicle to the preceding vehicles exist. The distance from the own vehicle to one of the preceding vehicles is called an "inter-vehicle distance." The laser radar 10 provides the detected inter-vehicle distance and direction with regard to each of the preceding vehicles as input data of a controller 50. In the exemplary embodiment, the direction in which the preceding vehicle exists is expressed in terms of a relative angle to the own vehicle. The region covered by the laser radar 10 extends from the longitudinal axis of the own vehicle to each side by about 6 degrees. Other angles can be chosen depending on design preference. Obstacles, such as preceding vehicle(s) within this region, can be detected.

A vehicle speed sensor 20 is provided to detect a vehicle speed of the own vehicle, such as by measuring a wheel speed or a revolution speed of an output member of a transmission, and provide the detected vehicle speed as input data to the controller 50.

The controller 50, which is responsible for the overall control of the driving operation assisting system 1, includes a central processing unit (CPU), a read only memory (ROM), a random access memory (RAM), and CPU peripheral devices. Based on the input data on the vehicle speed of the own vehicle from the vehicle speed sensor 20 and the input data on the distances from the laser radar, the controller 50 recognizes an obstacle situation. The obstacle situation may include a running state of the own vehicle relative to obstacle(s) in a field around the own vehicle, such as a distance from the own vehicle to each of the obstacles and a relative speed between the own vehicle and each of the obstacles. Based on the recognized obstacle situation, the controller 50 calculates risk potential associated with the own vehicle in view of the obstacles. Based on the calculated risk potential associated with the own vehicle, the controller 50 carries out the process as described below.

The driving operation assisting system 1 assists an operator in driving the own vehicle by regulating a reaction force, which is applied to an accelerator pedal 62 when the pedal 62 is pressed by the operator, and braking and driving forces to assist the driver conducting acceleration and deceleration operations. The controller 50 calculates risk potential corresponding to obstacle(s) in front of the own vehicle. Based on the calculated risk potential, the controller calculates a reaction force control amount of reaction force applied to the accelerator pedal. Further, based on the calculated risk potential, the controller 50 calculates a braking force control amount of braking force and a driving force control amount of driving force. The controller 50 provides the reaction force control amount to an accelerator pedal reaction force regulator 60, the braking force control amount to a braking force regulator 93, and the driving force control amount to the driving force regulator 63.

In response to the reaction force control amount, the accelerator pedal reaction force regulator 60 carries out a control process of torque generated by a servo motor 61 that constitutes a part of a link mechanism of the accelerator pedal 62. The servo motor 61 can control a step force, in any desired manner, that is applied to the accelerator pedal 62 by the operator upon stepping on the accelerator pedal 62, by regulating a reaction force in response to an instruction value provided by the accelerator pedal reaction force regulator 60.

An accelerator pedal stroke sensor 64 detects a rotary angle of the servo motor 61 given after translating the operation amount of the accelerator pedal 62 via the link mechanism. The accelerator pedal stroke sensor 64 provides the accelerator pedal operation amount to the controller 50 and also to a driving force regulator 63. A brake pedal stroke sensor 94 detects an operation amount (a depression amount) of a brake pedal 92 and provides the brake pedal operation amount to the controller 50 and also to a braking force regulator 93.

Figure 3:
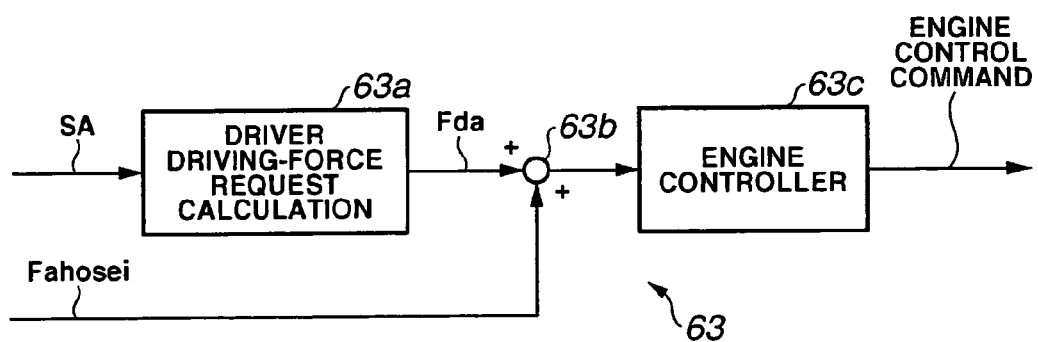
FIG. 3 is a schematic block diagram of an exemplary driving force regulator.
Figure 4:
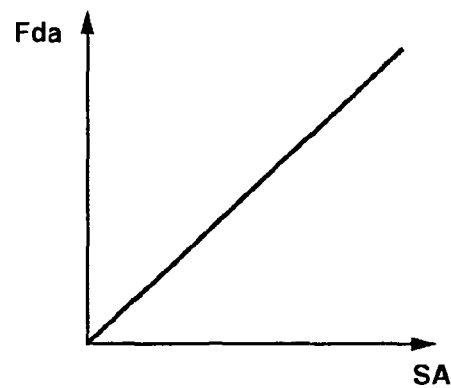
FIG. 4 shows an Fda–SA characteristic curve illustrating an exemplary relationship between an accelerator pedal operation amount (SA) and a driver driving-force request (Fda).

The driving force regulator 63 regulates an engine in such a manner that the engine operates to cause generation of driving force in response to a state of operation of the accelerator pedal 62. In response to an external instruction, the driving force regulator 63 modifies the engine operation to alter the magnitude of the driving force. FIG. 3 is a block diagram and FIG. 4 shows an Fda–SA characteristic map defining a relationship between a driver driving-force request Fda and an accelerator pedal operation amount SA. As shown in FIG. 3, the driving force regulator 63 includes a driver driving-force request calculation device 63a, an adder 63b, and an engine controller 63c.

Using a map illustrated in FIG. 4, the driver driving-force request calculation device 63a calculates a driver driving-force request Fda, i.e., a driving force requested by the operator via a manipulation of the accelerator pedal 62, in response to an accelerator pedal operation amount SA. The adder 63b calculates a target driving force by adding to the calculated driver driving-force request Fda a driving force correction amount Fahosei, and provides the target driving force to the engine controller 63c. The engine controller 63c calculates an instruction value to control the engine in accordance with the target driving force and provides the instruction value as an engine control command.

Turning back to FIG. 1, the braking force regulator 93 regulates the brake fluid (hydraulic) pressure in such a manner that the brake fluid pressure causes the application of a braking force in response to a state of operation of a brake pedal 92. In response to an external instruction, the braking force regulator 93 modifies the brake fluid pressure to vary the braking force in magnitude.

Figure 5:
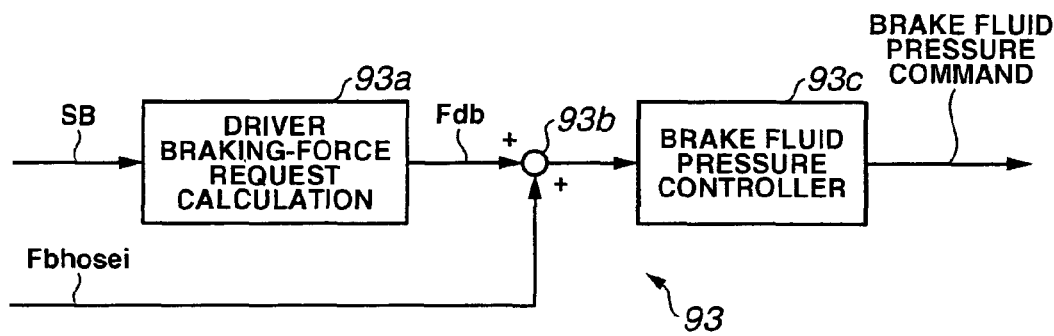
FIG. 5 is a schematic block diagram of a braking force regulator.
Figure 6:
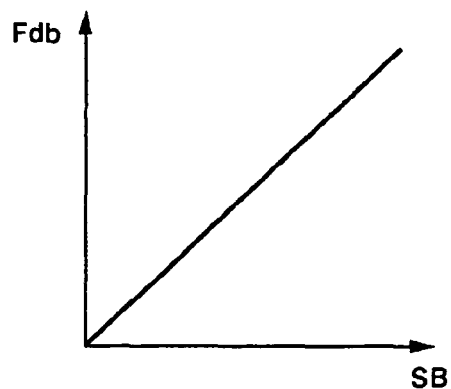
FIG. 6 shows an Fdb–SA characteristic curve illustrating an exemplary relationship between an accelerator pedal operation amount (SA) and a driver braking-force request (Fdb).

FIGS. 5 and 6 illustrate the operation of the braking force regulator 93. FIG. 5 is a block diagram and FIG. 6 shows an Fdb-SB characteristic map defining a relationship between a driver braking-force request Fdb and a brake pedal operation amount SB. As shown in FIG. 5, the braking force regulator 93 is composed of a driver braking-force request calculation device 93a, an adder 93b, and a brake fluid pressure controller 93c.

Using a map illustrated in FIG. 6, the driver braking-force request calculation device 93a calculates a driver braking-force request Fdb, i.e., a braking force requested by the operator via manipulation of the brake pedal 92, in response to a brake pedal operation amount SB. The adder 93b calculates a target braking force by adding to the calculated driver braking-force request Fdb a braking force correction amount Fbhosei, and provides the target braking force to the brake fluid pressure controller 93c. The brake fluid pressure controller 93c calculates a brake fluid pressure instruction value in accordance with the target braking force and provides the brake fluid pressure instruction value as a brake fluid pressure command. In response to the brake fluid pressure command, wheel brakes 95 for road wheels operate.

Figure 7:
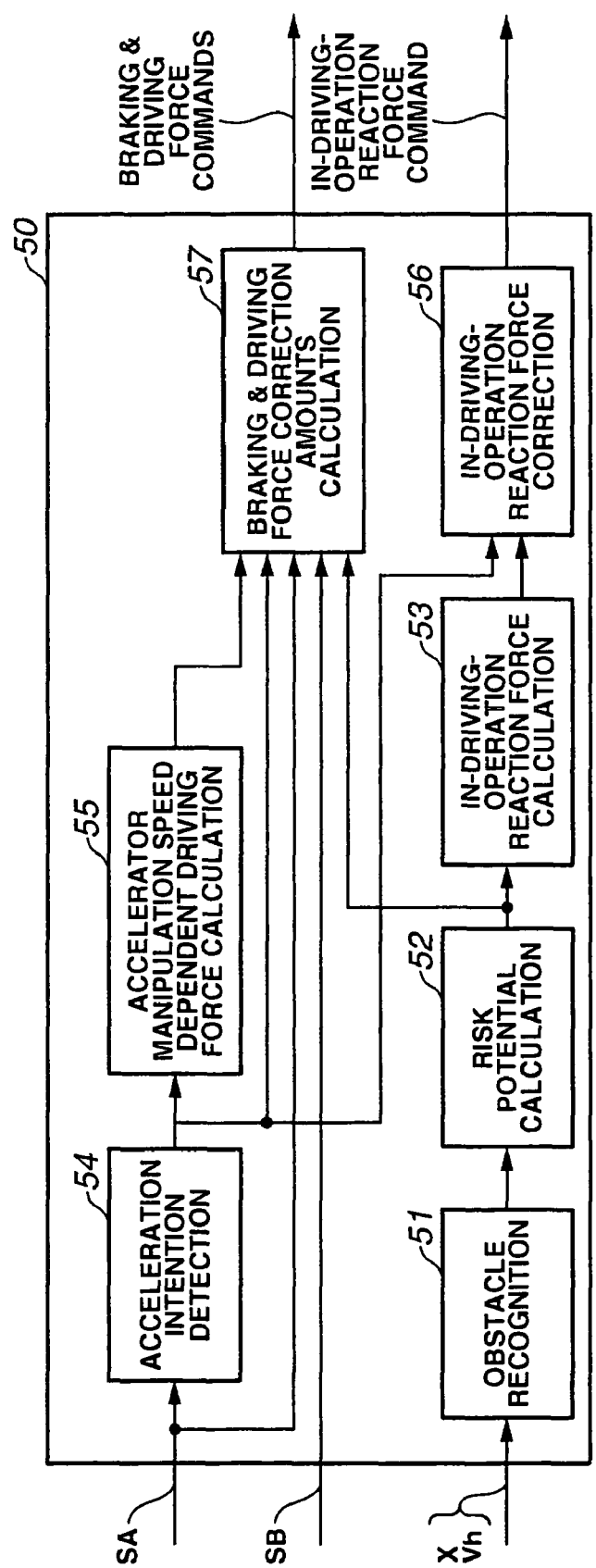
FIG. 7 is a block diagram of an exemplary controller.

FIG. 7 is a block diagram of the controller 50. The controller 50 includes, in the form of software implementation within a central processor unit (CPU), an obstacle recognition device 51, a risk potential calculation device 52, an in-driving-operation reaction force calculation device 53, an acceleration intention detection device 54, an accelerator manipulation speed dependent driving force calculation device 55, an in-driving-operation reaction force correction device 56, and a braking and driving force correction amounts calculation device 57.

The obstacle recognition device 51 recognizes an obstacle situation around the own vehicle based on the detected signals provided by the laser radar 10 and vehicle speed sensor 20. Based on the recognized obstacle situation, the risk potential calculation device 52 calculates risk potential RP associated with the own vehicle corresponding to the surrounding of the own vehicle. Based on the risk potential RP calculated by the risk potential calculation device 52, the in-driving-operation reaction force calculation device 53 calculates an in-driving-operation reaction force to be generated at an operator controlled manipulator, such as the accelerator pedal 62, which is provided for a driver to issue a command to adjust the driving force of the own vehicle. The "in-driving-operation reaction force" means a reaction force that the operator perceives, as a haptic input, upon manipulating the operator controlled manipulator during a driving operation.

The acceleration intention detection device 54 detects whether or not the operator is acting with an acceleration intention based on an accelerator pedal operation amount SA. Based on the operator acceleration intention and manipulation speed of the accelerator pedal 62, the accelerator manipulation speed dependent driving force calculation device 55 calculates an accelerator manipulation speed dependent driving force Fe.

In response to the operator acceleration intention, the in-driving-operation reaction force correction device 56 corrects the in-driving-operation reaction force calculated by the in-driving-operation reaction force calculation device 53, and provides an in-driving-operation reaction force command. Based on the risk potential RP calculated by the risk potential calculation device 52 and the accelerator manipulation speed dependent driving force Fe calculated by the accelerator manipulation speed dependent driving force calculation device 55, the braking and driving force correction amounts calculation device 57 calculates a driving force correction amount Fahosei and a braking force correction amount Fbhosei and provides them as braking force and driving force commands.

Figure 8:
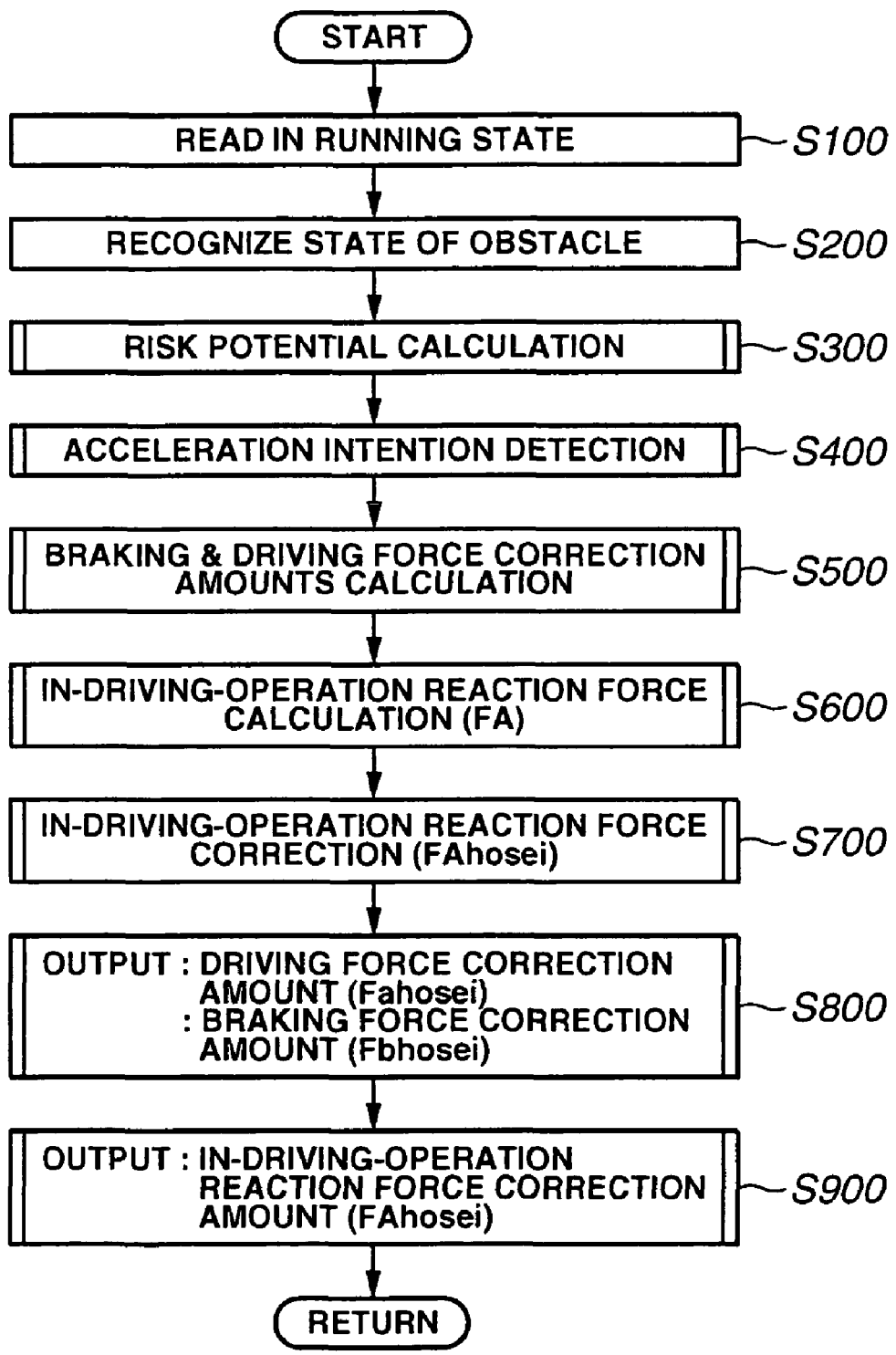
FIG. 8 is a flow chart illustrating exemplary steps of a main-routine of a driving operation assisting control program.

The following sections provide detailed description on the exemplary embodiment of the driving operation assisting system 1. FIG. 8 shows a flow chart illustrating steps of a driving operation assisting control program carried out by the controller 50 in the exemplary embodiment. Execution of this control program is repeated at regular intervals of, for example, 50 milliseconds.

At step S100, the controller 50 performs a reading operation of a running state. The running state means information on a running situation of the own vehicle, including an obstacle situation in front of the own vehicle. Inputs at step S100 are an inter-vehicle distance X from the own vehicle to an obstacle in front and a direction in which the obstacle exists, both of which are detected by the laser radar 10, and a vehicle speed Vh of the own vehicle detected by the vehicle speed sensor 20. Furthermore, inputs at step S100 are an accelerator pedal operation amount SA detected by the accelerator pedal stroke sensor 64 and a brake pedal operation amount SB detected by the brake pedal stroke sensor 94.

At step S200, the controller 50 recognizes a state or situation of the obstacle in front of the own vehicle based on the data on the running state obtained at step S100. In detail, the controller 50 recognizes a relative position of a current obstacle in front to the own vehicle or a direction and a speed of movement of the current obstacle using the stored past data in a memory of the controller 50 concerning a relative position of the obstacle relative to the own vehicle and a direction and a speed of movement of the obstacle and using the current data on the running state obtained at step S100. After collecting these data, the controller 50 recognizes the obstacle in front of the own vehicle in terms of its position, speed and direction.

At step S300, the controller 50 calculates risk potential RP against the obstacle, that is, the preceding vehicle in front of the own vehicle. The risk potential RP associated with the own vehicle corresponding to the preceding vehicle may be calculated in the manner as described below.

Figure 9A:
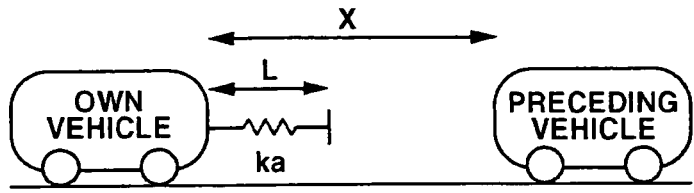
FIGS. 9(a) and 9(b) illustrate an exemplary model used for calculation of risk potential.
Figure 9B:
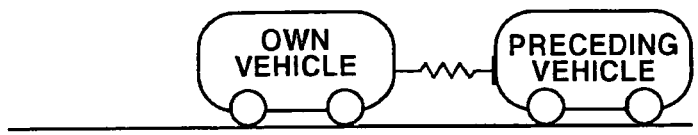

Referring to FIGS. 9(a) and 9(b), a model is illustrated for calculating risk potential RP associated with the own vehicle corresponding to the preceding vehicle. It is now assumed that the own vehicle with an elastic body extending ahead is following the preceding vehicle as shown in FIG. 9(a). Subsequently, the own vehicle is approaching the preceding vehicle and the elastic body is being compressed between the own vehicle and the preceding vehicle after the elastic body has come into contact with the preceding vehicle as shown in FIG. 9(b). As it is being compressed, the elastic body applies a running resistance to the own vehicle. The risk potential RP is defined as a spring force of the elastic body that is being compressed between the own vehicle and the preceding vehicle. Thus, the risk potential RP may be expressed as:

$$RP = ka \cdot (L-X) \quad \text{(Eq. 1)}$$

In the equation Eq. 1, ka is the spring constant of the elastic body, and L is the length of the elastic body. Appropriate values may be set as ka and L beforehand. One may calculate the length L based on a vehicle speed Vh of the own vehicle or a time to contact TTC between the own vehicle and the preceding vehicle or a time threshold between the own vehicle and the preceding vehicle. As the equation Eq. 1 clearly indicates, the risk potential RP increases as the inter-vehicle distance X gets short after elastic body has come into contact with the preceding vehicle. As shown in FIG. 9(a), the risk potential RP is zero (RP=0) unless the elastic body is pressed into contact with the preceding vehicle.

Turning back to FIG. 8, at step S400, the controller 50 detects whether or not the operator has an acceleration intention based on the accelerator pedal operation amount SA that was obtained at step S100. In the exemplary embodiment, the controller 50 executes a sub-routine illustrated in FIG. 10.

Figure 10:
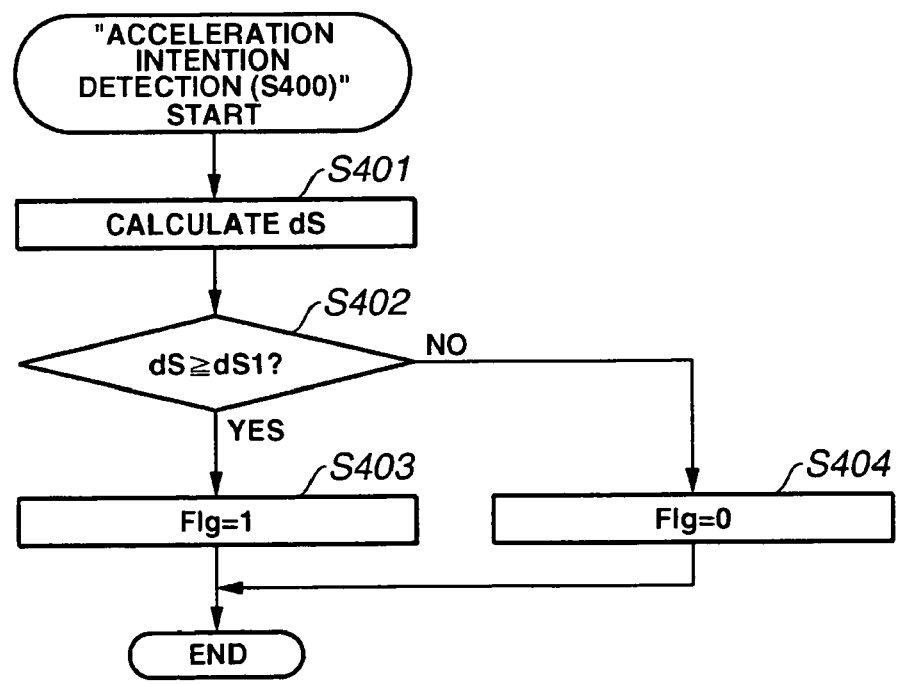
FIG. 10 is a flow chart of a sub-routine, illustrating exemplary steps of an acceleration intention detection process.

In FIG. 10, at step S401, using stored past and current value of the accelerator pedal operation amount SA, the controller 50 calculates an accelerator manipulation speed dS, that is, a speed at which the operator manipulates the accelerator pedal 62. One example of calculating the accelerator manipulation speed dS is to calculate the time differential of the accelerator pedal operation amount SA.

At step S402, the controller 50 judges whether or not the accelerator pedal manipulation speed dS is greater than or equal to a predetermined value dS1 (>0). If dS≧dS1 indicating that the operator has stepped on the accelerator pedal quickly, the controller 50 determines that the operator has an acceleration intention and the sub-routine proceeds to step S403. At step S403, the controller 50 sets an operator acceleration intention indicative flag Flg (Flg=1). If, at step S402, it judges that dS<dS1, the controller 50 determines that the operator does not have any acceleration intention and the sub-routine proceeds to step S404. At step S404, the controller 50 reset the flag Flg (Flg=0).

Turning back to FIG. 8, after detecting the operator acceleration intention at step S400, the main routine proceeds to step S500. At step S500, the controller 50 calculates a driving force correction amount Fahosei and a braking force correction amount Fbhosei, which are used to correct the driving force and the braking force applied to drive the own vehicle, based on the risk potential RP, obtained at step S300, and the acceleration intention, calculated at step S400. In the exemplary embodiment, to doe this job, the controller 50 executes a sub-routine illustrated in FIG. 11.

Figure 11:
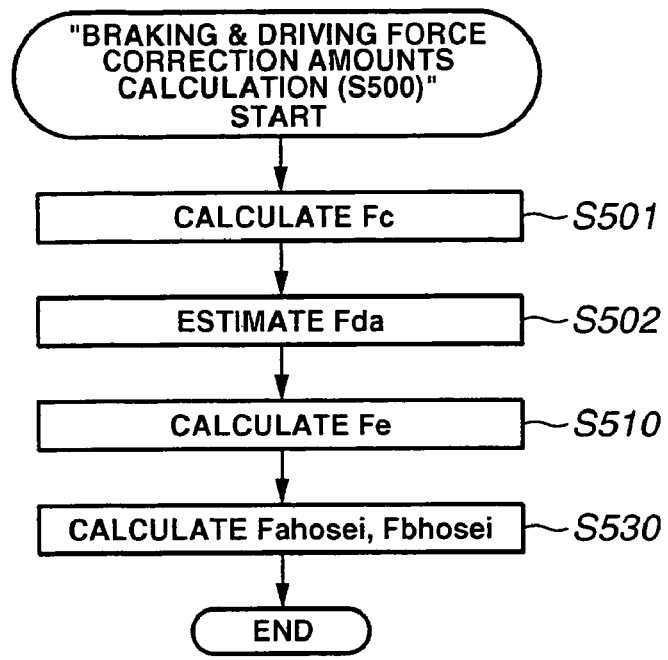
FIG. 11 is a flow chart of a sub-routine, illustrating exemplary steps of a braking and driving force correction amounts calculation process.
Figure 12:
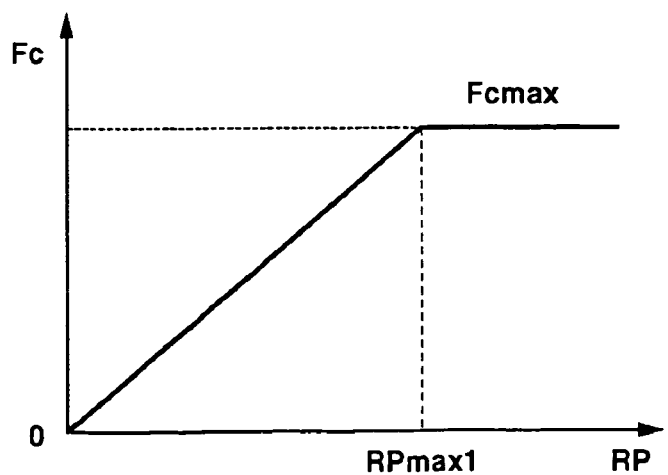
FIG. 12 shows an exemplary Fc–RP characteristic curve illustrating the relationship between risk potential (RP) and a repulsive force Fc of the illustrated elastic body in FIGS. 9(a) and 9(b).

In FIG. 11, at step S501, the controller 50 calculates a repulsive force Fc of the elastic body illustrated in FIGS. 9(a) and 9(b) based on the risk potential calculated at step S300. The relationship between risk potential RP and repulsive force Fc is illustrated in FIG. 12. As clearly indicated by FIG. 12, the repulsive force Fc increases as the risk potential RP increases because the elastic body is compressed by the preceding vehicle strongly. The repulsive force Fc is held at its maximum value Fcmax after the risk potential RP has exceeded the predetermined value RPmax1.

At step S502, the controller 50 estimates a driver driving-force request Fda. The controller 50 stores therein a driver driving-force request calculation map as illustrated in FIG. 4 to estimate a driver driving-force request Fda by retrieving this map using the accelerator pedal operation amount SA.

Figure 13:
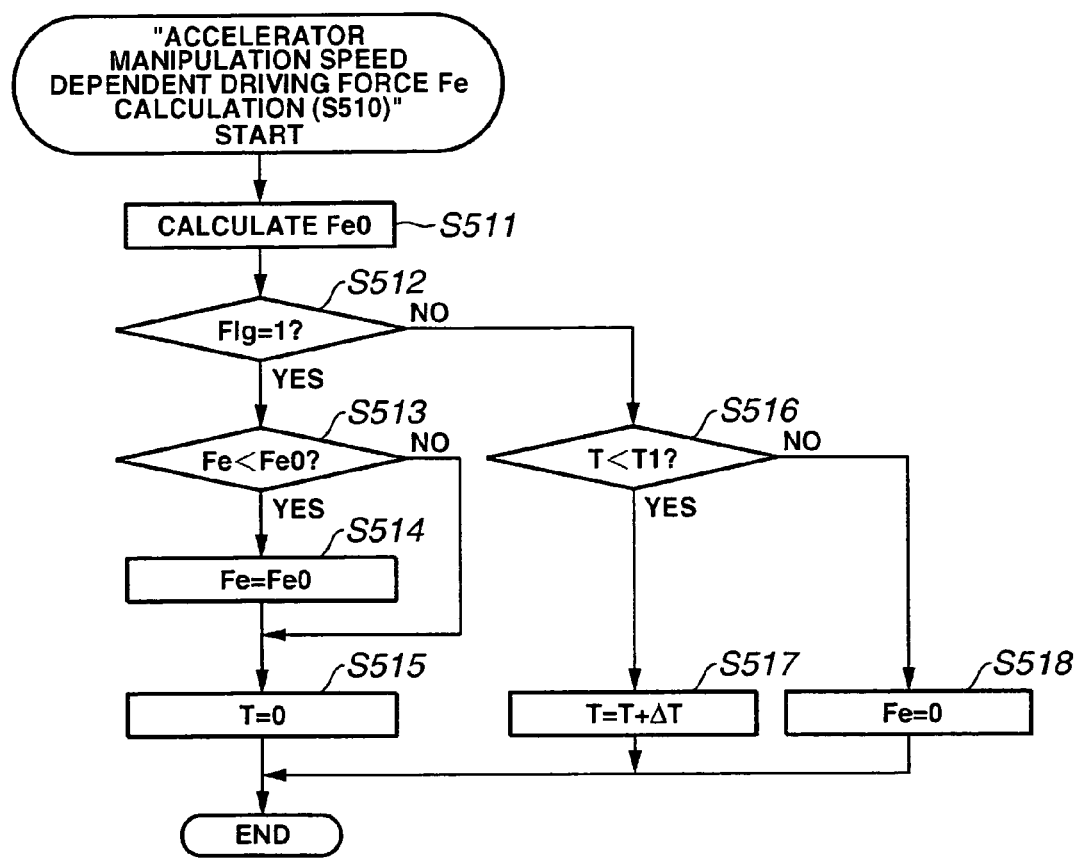
FIG. 13 is a flow chart of a sub-routine, illustrating exemplary steps of an accelerator manipulation speed dependent driving force (Fe) calculation process.
Figure 14:
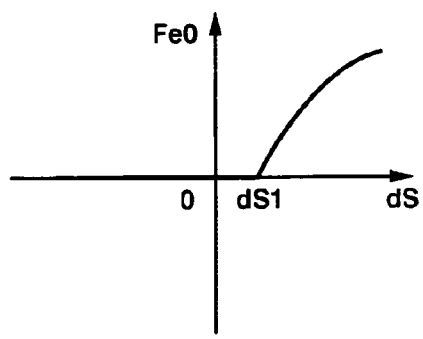
FIG. 14 shows an Fe0–dS characteristic curve illustrating an exemplary relationship between an accelerator manipulation speed (dS) and a driving-force base (Fe0).

At step S510, the controller 50 calculates an accelerator manipulation speed dependent driving force Fe based on the accelerator pedal manipulation speed dS and the operator acceleration intention. In the exemplary embodiment, to do this job, the controller 50 executes a sub-routine illustrated in FIG. 13. In FIG. 13, at step S511, the controller 50 calculates a driving-force base Fe0 based on the accelerator pedal manipulation speed dS. The relationship between the driving-force base Fe0 and the accelerator pedal manipulation speed dS is illustrated in FIG. 14. As shown in FIG. 14, the driving-force base Fe0 increases as the accelerator pedal manipulation speed dS increases beyond a predetermined value dS1. The driving-force base Fe0 is zero (Fe0=0) when the accelerator pedal manipulation speed dS is less than zero (dS<0) indicating that the accelerator pedal 62 is not being depressed.

At step S512, the controller 50 judges whether or not the acceleration intention indicative flag Flg is set (Flg=1?). If this is the case and it is judged that the operator has an acceleration intention, the sub-routine proceeds to step S513. At step S513, the controller 50 compares the stored accelerator manipulation speed dependent driving force Fe obtained in the last cycle to the current driving-force base Fe0.

If Fe<Fe0, the sub-routine proceeds to step S514. At step S514, the controller 50 sets the current driving-force base Fe0 as an accelerator manipulation speed dependent driving force Fe (Fe=Fe0). If the interrogation at step S513 results in negative, the controller 50 uses the stored accelerator manipulation dependent driving force Fe as it is. At step S515, the controller 50 resets a running time timer T (T=0), which indicates time elapsed after the operator has lost acceleration intention.

If the interrogation at step S512 results in negative and the operator does not have any acceleration intention, the sub-routine proceeds to step S516. At step S516, the controller 50 judges whether or not the running time timer T is less than a predetermined time T1. If T<T1, the sub-routine proceeds to step S517 where the controller 50 adds a predetermined value ΔT to the running time timer T (T=T+ΔT). In this case, the stored value obtained in the last cycle is used as the accelerator manipulation speed dependent driving force Fe.

If the interrogation at step S516 results in negative, the sub-routine proceeds to step S518 where the controller 50 sets zero as the accelerator manipulation speed dependent driving force Fe (Fe=0). In this manner, upon elapse of the predetermined time T1 after the operator has lost acceleration intention, the driving force Fe dependent on the accelerator pedal manipulation speed dS becomes zero (Fe=0).

Turning back to FIG. 11, after having calculated the accelerator manipulation speed dependent driving force Fe at step S510, the sub-routine proceeds to step S530.

At step S530, the controller 50 calculates a driving force correction amount Fahosei and a braking force correction amount Fbhosei using the repulsive force Fc calculated at step S501 and the accelerator manipulation speed dependent driving force Fe calculated at step S510. In the exemplary embodiment, to do this job, the controller 50 executes a sub-routine illustrated in FIG. 15.

Figure 15:
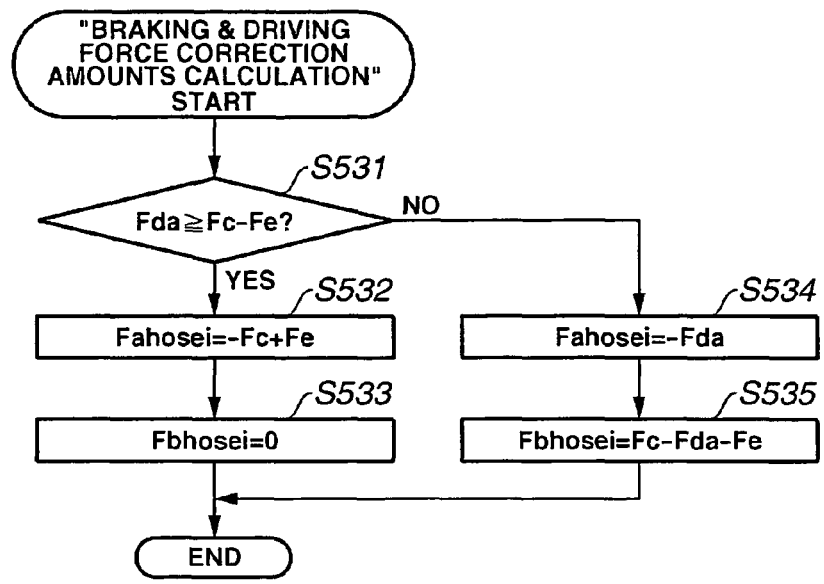
FIG. 15 is a flow chart of an exemplary sub-routine, illustrating steps of a braking & driving force correction amounts calculation process.
Figure 16A:
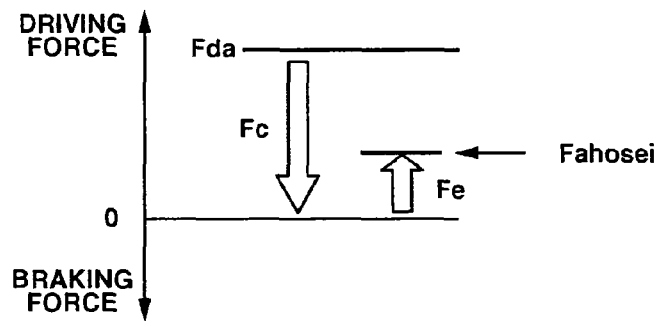
FIG. 16(a) illustrates an example for calculating a driving force correction amount (Fahosei).

In FIG. 15, at step S531, the controller 50 judges whether or not the driver driving-force request Fda, calculated at step S502, is greater than or equal to a value (Fc−Fe) given by subtracting the accelerator manipulation speed dependent driving force Fe from the repulsive force Fc. If Fda≧Fc−Fe, as illustrated in FIG. 16(a), the sub-routine proceeds to step S532 where the controller 50 calculates a driving force correction amount Fahosei using the following equation:

$$Fahosei = -Fc + Fe \quad (Eq. 2)$$

At the next step S533, the controller 50 sets zero as a braking force correction amount Fbhosei (Fbhosei=0) because a target braking/driving force may be obtained only by a reduction in driving force.

Figure 16B:
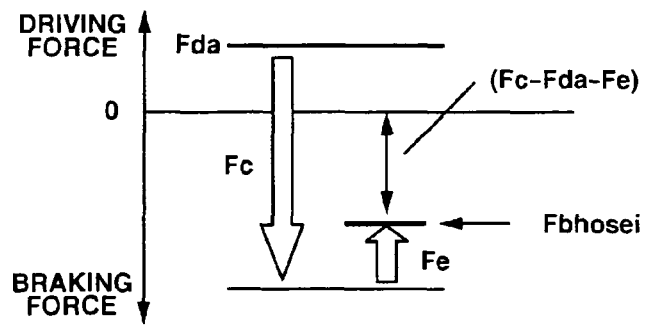
FIG. 16(b) illustrates an example for calculating a braking force correction amount (Fbhosei).

If the interrogation at step S531 results in negative (Fda<Fc−Fe) indicative of the case as illustrated in FIG. 16(b), the sub-routine proceeds to step S534 where the controller 50 sets −Fd as a driving force correction amount Fahosei (Fahosei=−Fd). At the next step S535, the controller 50 calculates a braking force correction amount Fbhosei using the following equation:

$$Fbhosei = Fc - Fda - Fe \quad (Eq. 3)$$

Figure 17:
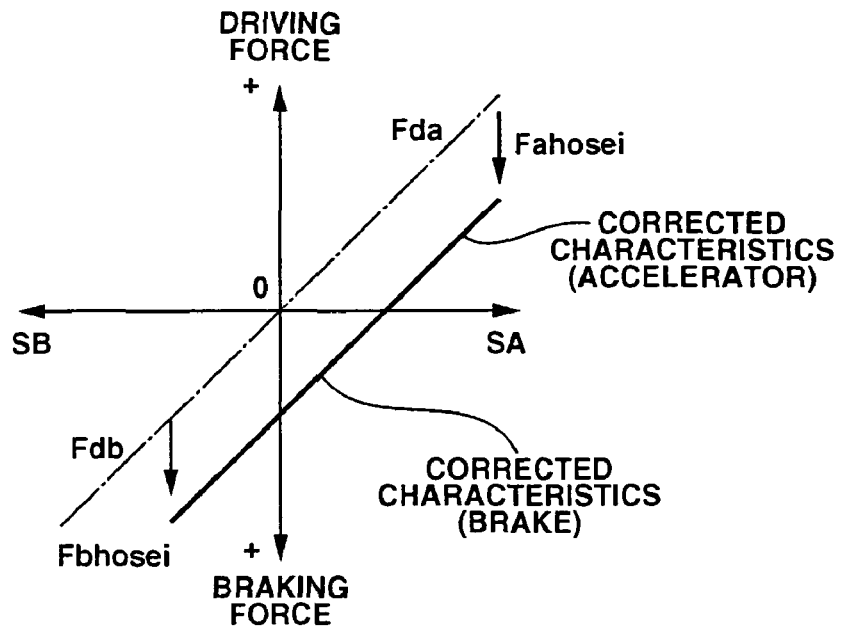
FIG. 17 is a view illustrating exemplary characteristics of a driving force correction amount relative to a braking force correction amount.

FIG. 17 is a view explaining the manner of correcting a driving force and a braking force. In FIG. 17, the horizontal axis represents an accelerator pedal operation amount SA and a braking pedal acceleration amount SB. The accelerator pedal operation amount SA increases in a rightward direction from the zero point along the horizontal axis, while the brake pedal operation amount SB increases in a leftward direction from the zero point along the horizontal axis. In FIG. 17, the vertical axis represents a driving force and a braking force. The driving force increases in an upward direction from the zero point along the vertical axis, while the braking force increases in a downward direction from the zero point along the vertical axis.

In FIG. 17, the one-dot chain line indicates a driver driving-force request Fda responsive to an accelerator pedal operation amount SA and a driver braking-force request Fdb responsive to a brake pedal operation amount SB. The fully drawn line indicates a driving force as corrected based on a repulsive force Fc and an accelerator manipulation speed dependent driving force Fe and a braking force as corrected based on the repulsive force Fc and the accelerator manipulation speed dependent driving force Fe.

If the accelerator pedal operation amount SA is large and Fda≧Fc−Fe, the driving force is corrected in a decreasing direction in response to the correction amount Fahosei. If the accelerator pedal operation amount SA is small and Fda<Fc−Fe, the correction amount Fahosei is set such that no driving force may appear and a braking force correction amount Fbhosei=Fc−Fda−Fe is set. This provides a gradual braking responsive to the accelerator pedal operation amount SA.

Turning to FIG. 8, after having calculated braking and driving force correction amounts Fahosei and Fbhosei at step S500, the main routine proceeds to step S600.

Figure 18:
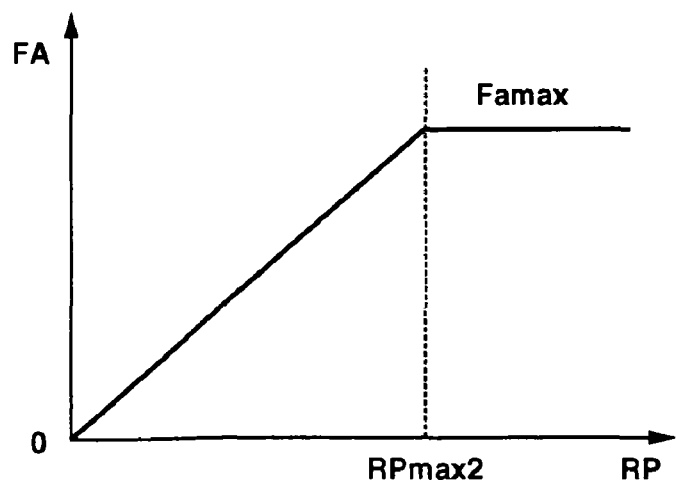
FIG. 18 shows an exemplary FA–RP characteristic curve illustrating the relationship between risk potential (RP) and an accelerator pedal reaction force control instruction value (FA).

At step S600, the controller 50 calculates a reaction force control instruction value FA based on the risk potential RP. FIG. 18 illustrates the relationship between the risk potential RP and the accelerator pedal reaction force control instruction value FA. As shown by the fully drawn line in FIG. 18, if the risk potential RP is less than a predetermined value RPmax2, the controller 50 calculates the accelerator pedal reaction force instruction value FA such that the greater the risk potential RP, the greater the accelerator pedal reaction force. If the risk potential is greater than or equal to the predetermined value RPmax2, the controller 50 fixes the accelerator pedal reaction force control instruction value FA to a maximum value FAmax to allow generation of the maximum accelerator pedal reaction force.

In FIG. 8, at step S700, the controller 50 corrects the accelerator pedal reaction force control instruction value FA, calculated at step S600, in response to the operator acceleration intention. In the exemplary embodiment, to do this job, the controller 50 executes a sub-routine shown in FIG. 19.

Figure 19:
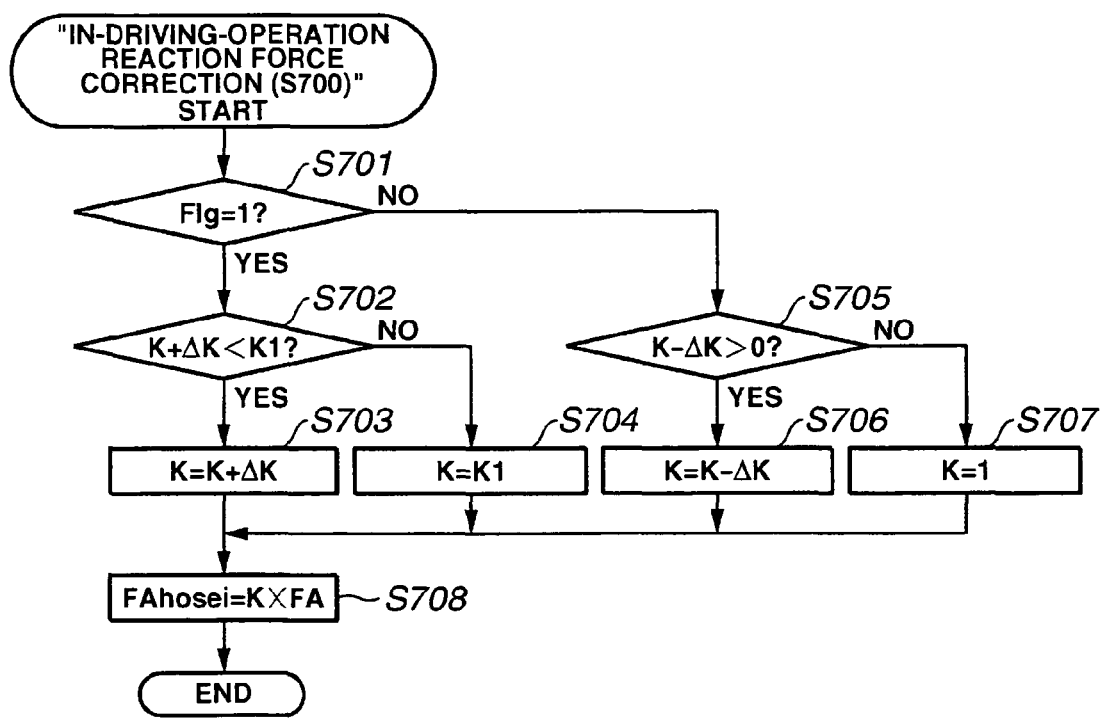
FIG. 19 is a flow chart of a sub-routine, illustrating steps of an in-driving-operation reaction force correction process.

In FIG. 19, at step S701, the controller 50 determines whether or not the acceleration intention indicative flag Flg is set (Flg=1). If this is the case, the main routine proceeds to step S702. At step S702, the controller 50 judges whether or not a value (K+ΔK) given by adding a variation amount ΔK to a reaction force correction coefficient K is less than a predetermined value K1. If (K+ΔK)<K1, the main routine proceeds to step S703.

At step S703, the controller 50 calculates the reaction force correction coefficient K by adding the variation amount ΔK to the last value of the correction coefficient. The correction coefficient K may be expressed as:

$$K = K + \Delta K \quad (Eq. 4)$$

If the interrogation at step S702 results in negative, the main routine proceeds to step S704 where the controller 50 sets a predetermined value K1 as the reaction force correction coefficient K (K=K1).

If the interrogation at step S701 results in negative and the operator does not have any acceleration intention, the main routine proceeds to step S705. At step S705, the controller 50 judges whether or not a value (K−ΔK) is greater than zero (0). If this is the case, the controller 50 calculates the reaction force correction coefficient K by subtracting a variation amount ΔK from the last value of the correction coefficient K. The correction coefficient K may be expressed as:

$$K = K - \Delta K \quad (Eq. 5)$$

If the interrogation at step S705 results in negative, the sub-routine proceeds to step S707 where the controller 50 set one (1) as the reaction force correction coefficient K (K=1).

At step S708, the controller 50 corrects the accelerator pedal reaction force control instruction value FA using the reaction force correction coefficient K calculated at step S703 or S704 or S706 or S707. The corrected accelerator pedal reaction force control instruction value FAhosei may be expressed as:

$$FAhosei = K \cdot FA \quad (Eq. 6)$$

Turning back to FIG. 8, after calculating the accelerator pedal reaction force correction amount FAhosei at step S700, the main routine proceeds to step S800.

At step S800, the controller 50 provides the driving force correction amount Fahosei, as an output signal called driving force command, to the driving force regulator 63 (see FIG. 1), and it provides the braking force correction amount Fbhosei, as an output signal called braking force command, to the braking force regulator 93 (see FIG. 1). Referring to FIG. 3, in the driving force regulator 63, a target driving force is calculated from the driver driving-force request Fda and the driving-force correction amount Fahosei, and the engine controller 63c controls the engine so that the calculated target driving force may be generated. Referring to FIG. 5, in the braking force regulator 93, a target braking force is calculated from the driver braking-force request Fdb and the braking-force correction amount Fbhosei, and the brake fluid pressure controller 93c regulates brake fluid pressure applied to the wheel brakes so that the target braking force may be generated.

At step S900, the controller 50 provides the accelerator pedal reaction correction amount FAhosei, as an output called in-driving-operation reaction force command, to the accelerator pedal reaction force regulator 60 (see FIG. 1). The accelerator pedal reaction force regulator 60 regulates reaction force from the accelerator pedal 62 in response to the command. After the job at step S900, the present cycle of execution of the main routine ends.

The exemplary embodiment provides the following effects:

(1) The driving operation assisting system 1 calculates risk potential RP based on the obstacle situation around the own vehicle. Based on the calculated risk potential RP, the system 1 corrects the relationship of the driving torque relative to an accelerator pedal operation amount SA in a direction reducing the driving torque as shown in FIG. 17 and regulates in-driving-operation reaction force from the accelerator pedal 62. In response to operator driving operation for acceleration, the system 1 carries out the driving force control and the in-driving-operation reaction force control in response to the risk potential RP after carrying out acceleration control demanded by the operator.

Upon recognition of operator acceleration intention, the system 1 reduces the driving force correction amount Fahosei by the accelerator manipulation dependent driving force Fe, which is dependent on the accelerator manipulation speed dS. When the operator acceleration intention disappears, the system 1 changes for the driving force control and the in-driving-operation reaction force control in response to the calculated risk potential RP. Accordingly, the system 1 allows a control process that reflects the operator's acceleration intention, in the situation where the operator expects acceleration to some extent, to perform before transmitting information related to risk potential RP around the own vehicle to the operator via deceleration and varying of accelerator pedal reaction force.

(2) The controller 50 provides an estimated amount of acceleration that the operator expects during a driving operation, and transmits a change in acceleration based on the estimated acceleration to the operator. The controller 50 transmits acceleration feel to the operator in response to the degree of the driving operation for acceleration when risk potential RP exists while transmitting deceleration feel to the operator by reducing the driving force in response to the risk potential RP. Thus, the realization of acceleration feel expected by the operator is compatible with the transmission of risk potential RP to the operator.

(3) The controller 50 calculates, as the estimated acceleration, an accelerator manipulation speed dependent driving force Fe based on accelerator pedal manipulation speed dS. The controller 50 subtracts the accelerator manipulation driving force Fe from the value Fc determined in response to the risk potential RP to give a result as the calculated driving force correction amount Fahosei. The controller 50 can calculate the appropriate accelerator manipulation speed dependent driving force Fe based on how quickly the operator wishes realization of acceleration. Of course, it is possible to calculate driving force Fe directly from the accelerator pedal operation amount SA.

(4) The driving operation assisting system 1 varies the acceleration of the vehicle via regulation of driving force responsive to detection of an operator acceleration intention. In this manner, changes in acceleration are transmitted to the operator clearly.

(5) The driving operation assisting system 1 corrects in-driving-operation reaction force applied to the accelerator pedal 62 responsive to detection of operator acceleration intention. An appropriate balance between the regulated deceleration upon detection of operator acceleration intention and the accelerator pedal reaction force.

(6) The driving operation assisting system 1 carries out an adjustment of driving force in an increasing direction and a correction of accelerator pedal reaction force in an increasing direction. Thus, the system 1 transmits acceleration feel in accordance with an operator manipulation of accelerator pedal 62 to the operator with the constraint of restraining driving force from increasing, by increasing the accelerator pedal reaction force.

Second Exemplary Embodiment

This exemplary embodiment is substantially the same as the previously described embodiment represented by FIGS. 1 and 2. Thus, the following sections provide description only on differences of this embodiment from the previously described embodiment.

Figure 20:
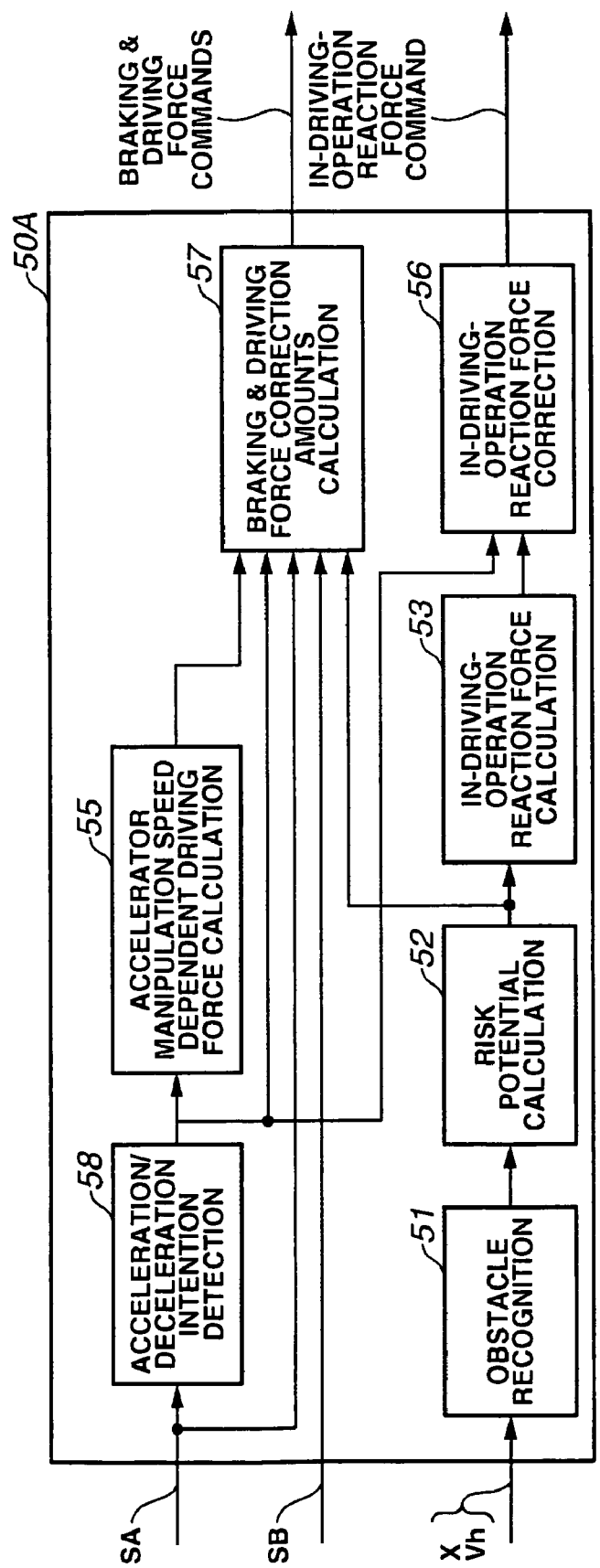
FIG. 20 is a block diagram of a controller of a second exemplary embodiment of a system and a method for assisting driving operation of an operator driving a motor vehicle.

Referring to FIG. 20, this exemplary embodiment of a driving operation assisting system comprises a controller 50A. The controller 50A includes an obstacle recognition device 51, risk potential calculation device 52, an in-driving-operation reaction force calculation device 53, an accelerator manipulation speed dependent driving force calculation device 55, an in-driving-operation reaction force correction device 56, a braking and driving force correction amounts calculation device 57, and an acceleration/deceleration intention detection device 58. The acceleration/deceleration intention detection device 58 detects whether the operator has an acceleration intention or a deceleration intention based on an accelerator pedal operation amount SA.

Figure 21:
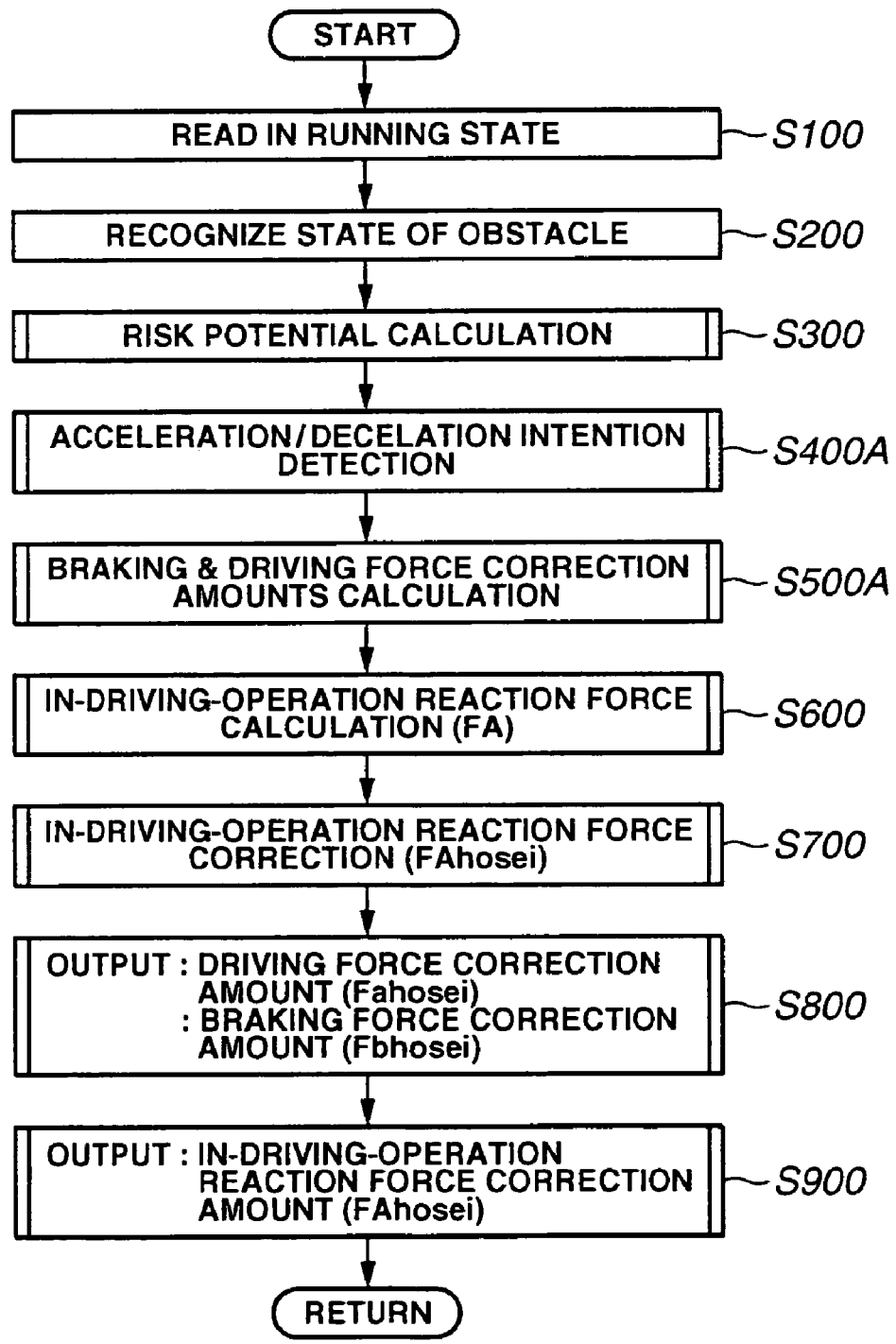
FIG. 21 is a flow chart of a main routine, illustrating steps of a driving operation assisting control program employed.

The following sections provide description on how the driving operation assisting system works. FIG. 21 is a flow chart of steps of a driving operation assisting control program to be executed by the controller 50A. Execution of this program is repeated at regular intervals of 50 milliseconds, for example. The main routine shown in FIG. 21 has steps S100 to S300 corresponding exactly to their counterpart steps illustrated in FIG. 8, and it also has steps S600 to S900 corresponding exactly to their counterpart steps illustrated in FIG. 8. Thus, detailed description on them is hereby omitted.

Figure 22:
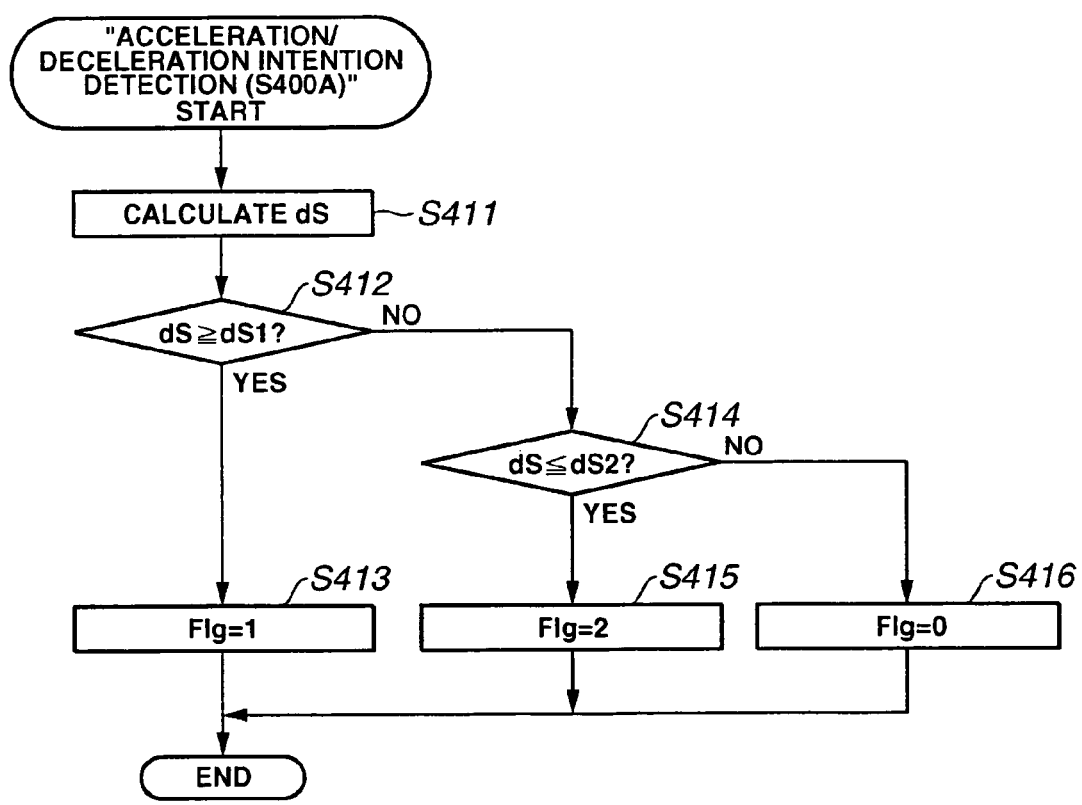
FIG. 22 is a flow chart of a sub-routine, illustrating steps of an acceleration/deceleration intention detection process.

In FIG. 21, at step S400A, the controller 50A judges whether the operator has an acceleration intention or a deceleration intention. In the second exemplary embodiment, the controller 50A executes a sub-routine illustrated in FIG. 22. At step S411, the controller 50A calculates an accelerator pedal manipulation speed dS from an accelerator pedal acceleration amount SA. At step S412, the controller 50A judges whether or not the accelerator pedal manipulation speed dS is greater than or equal to a predetermined value dS1.

If, at step S412, the controller 50A judges that the interrogation results in affirmative and the operator has stepped on the accelerator pedal at a speed greater than or equal to a predetermined speed S1, the sub-routine proceeds to step S413. At step S413, the controller 50A judges that the operator has an acceleration intention and set one (1) as an acceleration intention flag Flg (Flg=1). If the interrogation at step S412 results in negative, the sub-routine proceeds to step 414. At step S414, the controller 50A judges whether or not the accelerator manipulation speed dS is less than or equal to a predetermined value dS2 (<0).

If, at step S414, the controller 50A judges that the interrogation results in affirmative and the operator allows the accelerator pedal 62 to return at a speed greater than or equal to the predetermined value, the sub-routine proceeds to step S415. At step S415, the controller 50A judges that the operator has a deceleration intention and sets two (2) as the flag Flg (Flg=2). If, at step S414, the controller 50A determines that the interrogation results in negative and the operator does not have any acceleration intention and deceleration intention, the sub-routine proceeds to step S416. At step S416, the controller 50A reset the flag Flg (Flg=0).

Turning back to FIG. 21, after having detected the operator acceleration or deceleration intention, the main-routine proceeds to step S500A. At step S500A, the controller 50A executes a sub-routine similar to one illustrated in FIG. 11 to calculate a driving force correction amount Fahosei and a braking force correction amount Fbhosei. This sub-routine has steps corresponding exactly to steps S501, S502 and S530. However, the controller 50A executes a sub-routine illustrated in FIG. 23 to doe a job at step S510 as different from the first exemplary embodiment in which the controller executed the sub-routine illustrated in FIG. 13.

Figure 23:
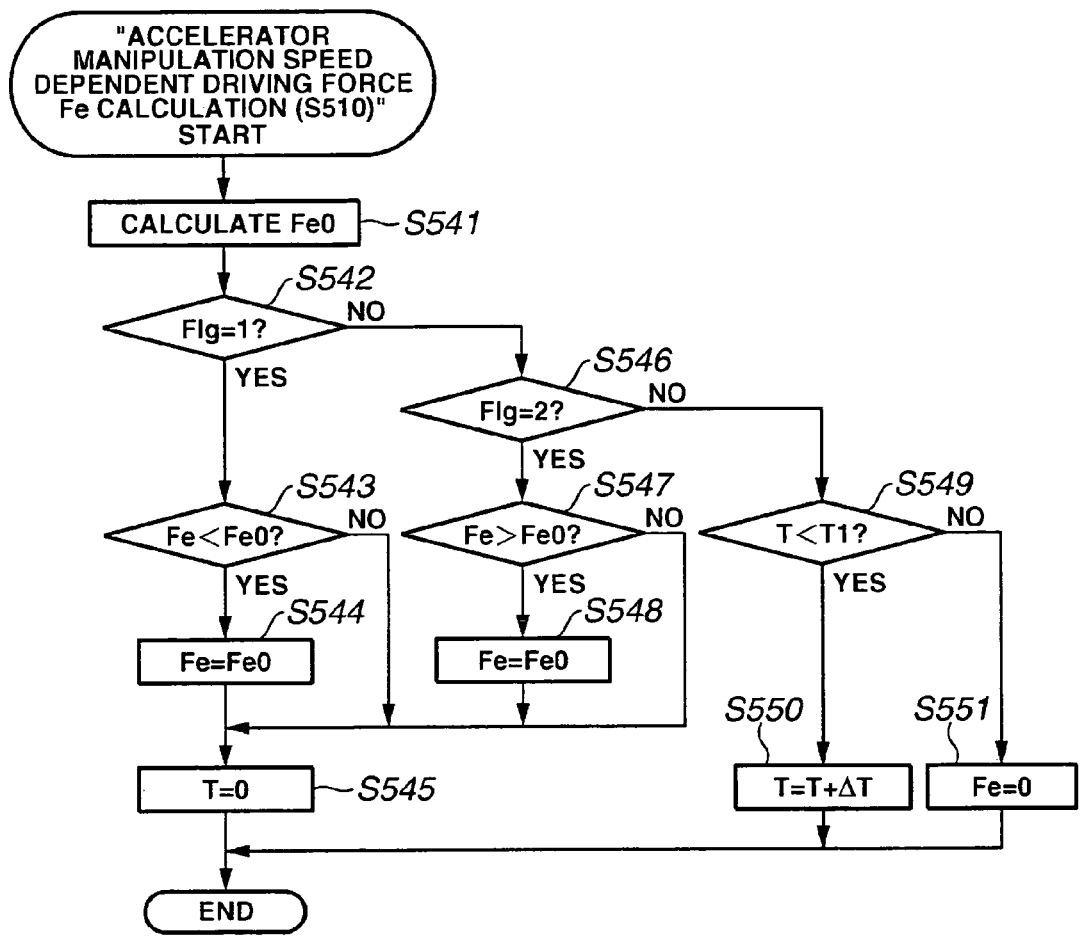
FIG. 23 is a flow chart of a sub-routine, illustrating steps of an accelerator manipulation speed dependent driving force (Fe) calculation process.

In FIG. 11, at step S510, the controller 50A executes the sub-routine illustrated in FIG. 23.

Figure 24:
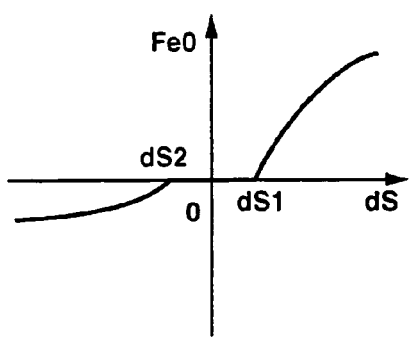
FIG. 24 shows an Fe0–dS characteristic curve illustrating the relationship between an accelerator manipulation speed (dS) and a driving-force base (Fe0).

In FIG. 23, at step S541, the controller 50A calculates a driving-force base Fe0 relative to the accelerator pedal manipulation speed dS by referring to the illustrated relationship in FIG. 24. As shown in FIG. 24, the driving-force base Fe0 increases as the accelerator pedal manipulation speed dS increases beyond a predetermined value dS1 (>0), while the driving-force base decreases as the accelerator pedal manipulation speed dS decreases below a predetermined value dS2 (<0). The driving-force base Fe0 is less than zero (Fe0<0) when the operator is manually releasing the accelerator pedal 62.

At step S542, the controller 50A judges whether or not the flag Flg is set equal to 1 to determine whether the operator has an acceleration intention. If the interrogation at step S542 results in affirmative, the sub-routine proceeds to step S543 where the controller 50A compares the last cycle value of the accelerator manipulation speed dependent driving force Fe to the driving force base Fe0. If Fe<Fe0, the sub-routine proceeds to step S544, the controller 50A sets the driving force base Fe0 as the accelerator manipulation speed dependent driving force Fe (Fe=Fe0). If the interrogation at step S543 results in negative, the controller 50A uses the last cycle value of the accelerator manipulation speed dependent driving force Fe as the current value thereof.

If the interrogation at step S542 results in negative, the sub-routine proceeds to step S546. At step S546, the controller 50A determines whether or not the flag Flg is equal to 2 to determine whether the operator has a deceleration intention. If the interrogation at step S546 results in affirmative, the sub-routine proceeds to step S547. At step S547, the controller 50A judges whether or not the last cycle value of accelerator manipulation speed dependent driving force Fe is greater than the current driving force base Fe0. If Fe>Fe0, the sub-routine proceeds to step 548 where the controller 50A sets the driving force base Fe0 as the current accelerator manipulation speed dependent driving force Fe (Fe=Fe0). If the interrogation at step S547 results in negative, the controller 50A uses the last cycle value of accelerator manipulation speed dependent driving force Fe as the current one.

At step S545, the controller 50A sets zero (0) as a running time timer T (T=0), which is indicative of time elapsed after an acceleration intention or a deceleration intention has disappeared.

If the interrogation at step S546 results in negative, the sub-routine proceeds to step S549 because the operator does not have any acceleration intention and any deceleration intention. At step S549, the controller 50A determines whether or not the running time timer T is less than a predetermined time T1. If this is the case, the sub-routine proceeds to step S550 where the controller 50A updates the running time timer T (T=T+ΔT). If the interrogation at step S549 results in negative, the sub-routine proceeds to step S551 where the controller 50A sets zero (0) as the current accelerator manipulation speed dependent driving force Fe (Fe=0).

Turning back to FIG. 11, after having calculated the current accelerator manipulation speed dependent driving force Fe at step S510, the sub-routine proceeds to step S530. At step S530, the controller 50A calculates a driving force correction amount Fahosei and a braking force correction amount Fbhosei in the same manner as the first exemplary embodiment.

In addition to the effects provided by the first exemplary embodiment, the second exemplary embodiment provides the following effects:

The driving operation assisting system detects an operator acceleration intention and deceleration intention based on accelerator pedal manipulation speed dS, and adjusts, if the operator deceleration intention is detected, an amount of reduction in driving force or an amount of increase in braking force in an increasing direction based on a return speed of the accelerator pedal 62. Thus, the driving operation assisting system ensures, if the operator has a deceleration intention, reliable deceleration in response to the deceleration intention together with acceleration, if the operator has acceleration intention, reflecting the operator acceleration intention before anything else.

Variations

Figure 25:
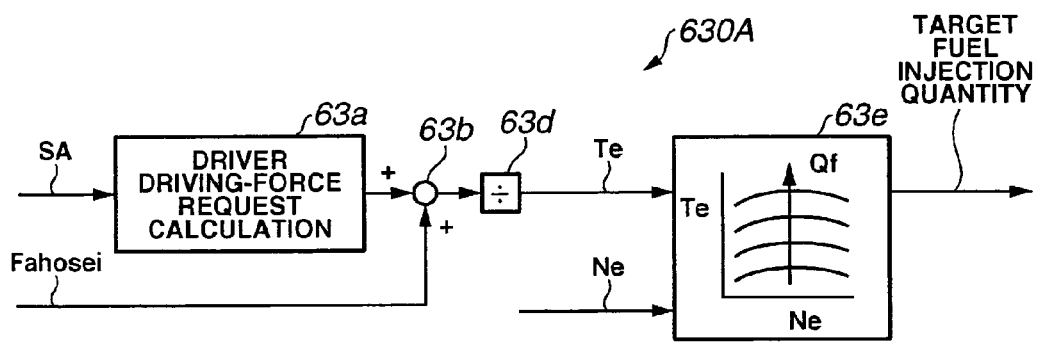
FIG. 25 is a schematic block diagram of a modified driving force regulator configured to calculate a target fuel injection quantity.

In the first and second exemplary embodiments, the engine controller 63c of the driving force regulator 63 calculates the engine control command as shown in FIG. 3. The driving force regulator 63 regulates driving torque by modifying engine operating conditions, a speed ratio to be selected in an automatic transmission (not illustrated) and the opening position of a throttle valve (not illustrated). The engine operating conditions may be modified by, for instance, varying an amount of injected fuel or changing a spark timing, alone or in combination with modifying an opening position of a throttle valve. If modifying an mount of injected fuel is employed, a driving force regulator 630A, which calculates a target value of the fuel injection quantity, as shown in FIG. 25, may be used. If changing an amount of intake air is employed, a driving force regulator 630B, which calculates a target value of the intake air quantity, is used.

As shown in FIG. 25, the driving force regulator 630A includes a driver driving-force request calculation device 63a, an adder 63b, a divider 63d and a target fuel injection quantity calculation device 63e. The divider 63d receives signals including information related to the corrected driver driving-force request from the adder 63b and a gear ratio from the automatic transmission. Using these input signals, the divider 63d calculates a target engine torque Te. The target fuel injection quantity calculation device 63e receives the target engine torque Te and an engine speed Ne, and stores the illustrated map used for calculation of a target fuel injection quantity Qf. Using the stored map, the target fuel injection quantity calculation device 63e calculates the target fuel injection quantity Qf as directed by the map versus the input signals Te and Ne.

Figure 26:
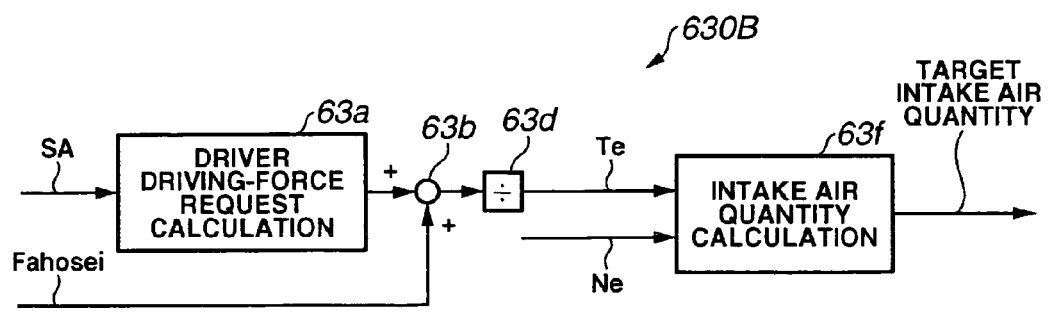
FIG. 26 is a schematic block diagram of another modified driving force regulator configured to calculate a target intake air quantity.

Referring now to FIG. 26, the driving force regulator 630B includes a driver driving-force request calculation device 63a, an adder 63b, a divider 63d, and an intake air quantity calculation device 63f. The intake air quantity calculation device 63f calculates a target intake air quantity Qf based on the engine speed Ne and the target engine torque Te. The calculated target intake air quantity Qf may be realized by varying the throttle opening.

The above described control of fuel injection quantity or intake air quantity can adjust a driving force propelling the own vehicle by dynamically adjusting the engine operating conditions.

As explained in connection with the first and second exemplary embodiments, after or upon judging that the operator has an acceleration intention when the accelerator pedal manipulation speed dS exceeds the predetermined value dS1, the driving and/or braking forces were adjusted for carrying out the operator manipulation dependent acceleration control before anything else, and the in-driving-operation reaction force from the accelerator pedal 62 was also corrected. The adjustments of the driving and/or braking force are performed for a first predetermined period of time, and the correction of the in-driving-operation reaction force is in effect for a second predetermined period of time, both periods of which start from the detection of the operator acceleration intention. In detail, the first predetermined period of time during which the driving and/or braking force are being adjusted consists of a time duration when the operator acceleration intention is being detected and a predetermined time T1 beginning with the moment when the detection of the operator acceleration intention disappears. The second period of time during which the in-driving-operation is being corrected begins with the detection of the operator acceleration intention and ends at the moment when the reaction force correction coefficient K returns to 1.

In one embodiment, the adjustment of the driving and/or braking forces and the correction of the in-driving-operation reaction force, which accompany the detection of operator acceleration intention, are carried out prompt acceleration control before anything else without accelerating too much. According to one embodiment, an adjustment/correction time, i.e., the first predetermined period of time or the second predetermined period of time, is determined and set based on the risk potential RP associated with the own vehicle and the operator driving operation situation.

For example, it is set that the greater the risk potential RP, the shorter the adjustment/correction time is. This setting is intended to transmit the risk potential RP to the operator with good and prompt accuracy if the risk potential RP is high. The adjustment/correction time may be extended in response to the need for a change in motion of the own vehicle when the operator operates to change to a new lane or to pass the preceding vehicle. If the above-mentioned need for a change in motion arises, the adjustment/correction time is extended on serious consideration of the operator acceleration intention even when the risk potential RP is high.

Figure 27:
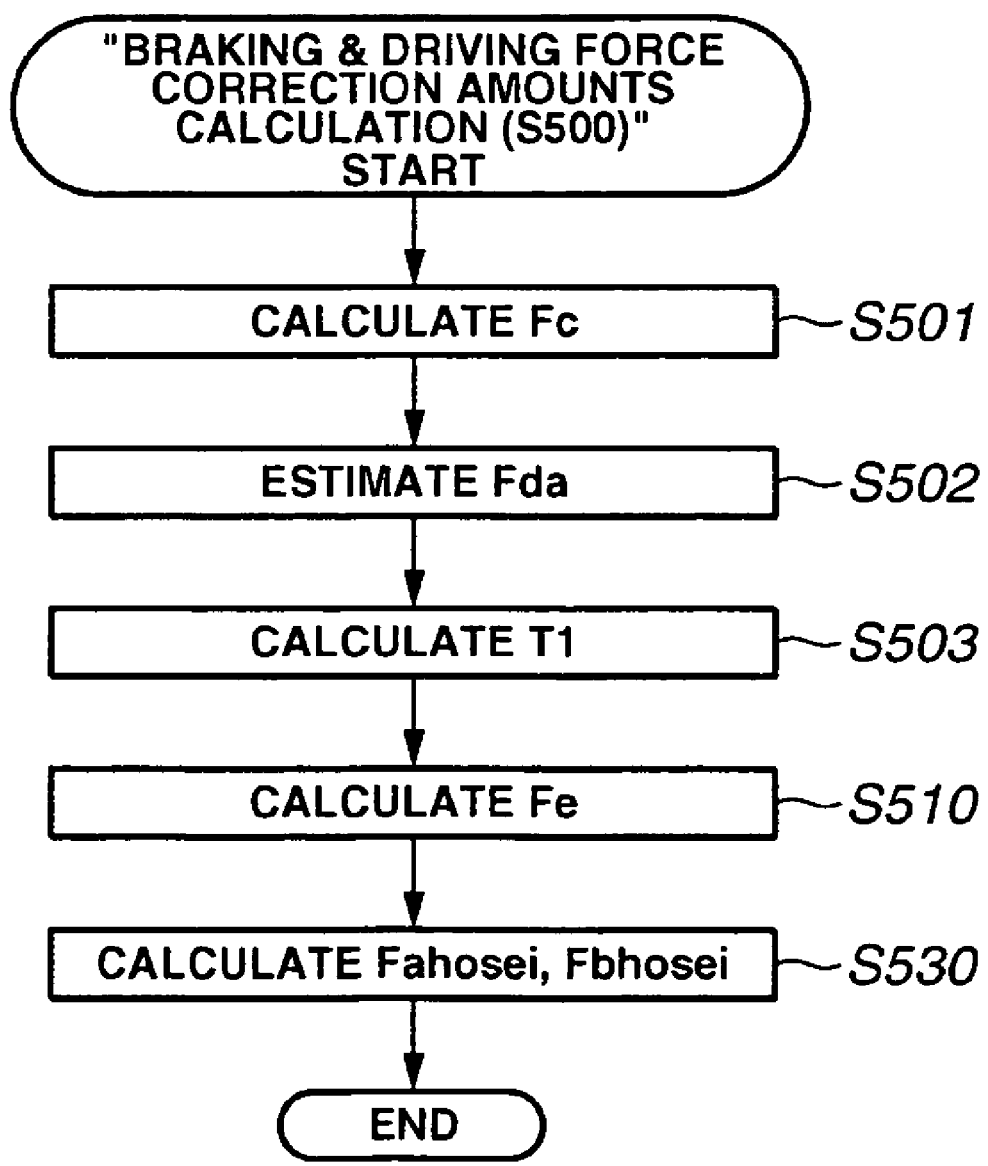
FIG. 27 is a flow chart of a sub-routine, illustrating steps of a braking & driving force correction amounts calculation process featuring varying of adjustment time.
Figure 28:
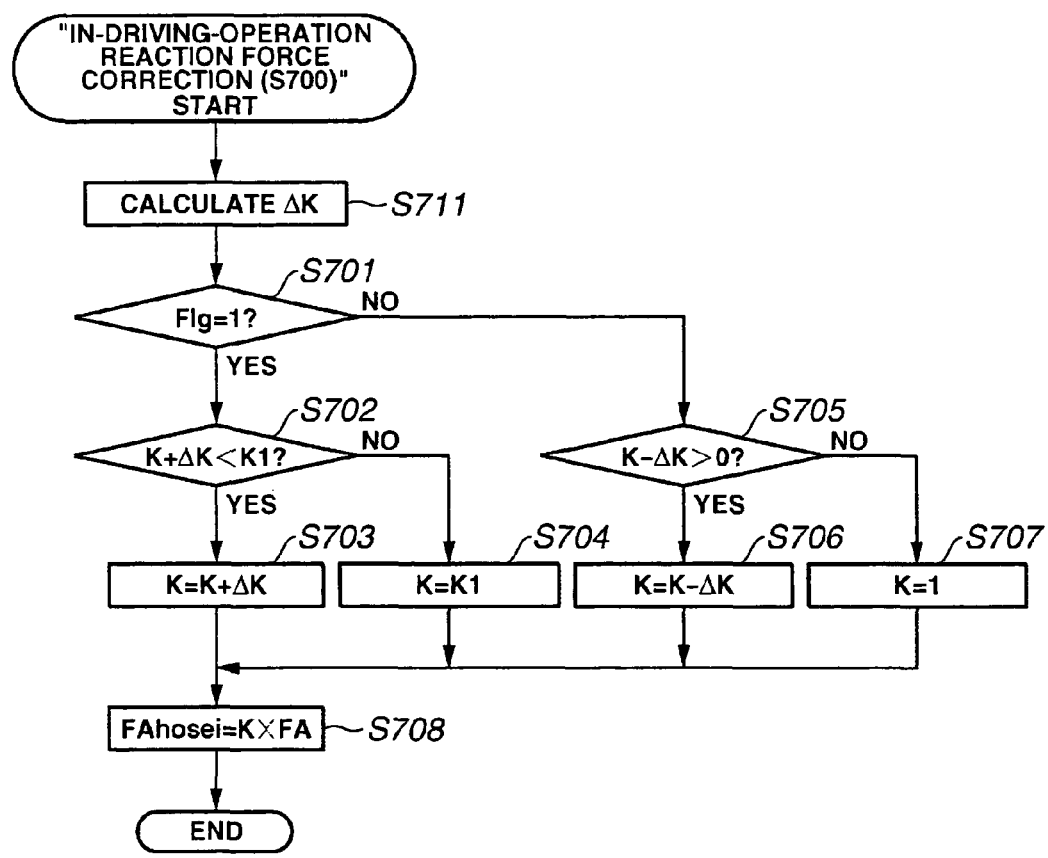
FIG. 28 is a flow chart of a sub-routine, illustrating steps of an in-driving-operation reaction force correction process featuring varying of correction time.

Referring next to FIGS. 27 and 28, FIG. 27 is a flow chart illustrating steps of a braking and driving force correction amounts calculation process involving a change in adjustment time, and FIG. 28 is a flow chart illustrating steps of an in-driving-operation reaction force correction process involving a change in correction time. The braking and driving force correction amounts calculation process is carried out as a sub-routine executed at step S500 of the main routine illustrated in FIG. 8. The in-driving-operation reaction force correction process is carried out as a sub-routine executed at step S700 of the main routine illustrated in FIG. 8.

The flow chart illustrated in FIG. 27 is substantially the same as the flow chart illustrated in FIG. 11 except the provision of a new step S503 between the steps S502 and S510. Referring to the braking and driving force correction amounts calculation process illustrated in FIG. 27, the step S503 is provided for calculating the predetermined time T1, which is used in the step S510 and the sub-routine illustrated in FIG. 13, for comparison to the running time timer T based on the risk potential RP or operator intention to change for a new lane.

The flow chart illustrated in FIG. 28 is substantially the same as the flow chart illustrated in FIG. 19 except the provision of a new step S711 immediately before the step S701.

Referring to the in-driving-operation reaction force correction process illustrated in FIG. 28, the step S711 is provided to calculate a variation amount ΔK, by which a reaction force correction coefficient K varies during one cycle, based on the risk potential RP or operator intention to change for a new lane. The smaller the variation ΔK, the longer is the correction time, i.e., the second predetermined period of time. The larger the variation ΔK, the shorter the correction time is. It is possible to alter a predetermined time K1 to be compared to the correction coefficient based on the risk potential RP or the like.

Setting, in the above-mentioned manner, the adjustment or correction time for braking and driving force adjustment and in-driving-operation reaction force correction accompanying the operator acceleration intention provides an appropriate control taking the situation of the own vehicle at any point of time into consideration.

In the preceding description of the first and second exemplary embodiments, both of the braking and driving force adjustment and accelerator pedal reaction force correction were carried out accompanying an operator acceleration intention. The present disclosure is not limited to this example. It is possible to carry out the braking and driving force adjustment only to meet an operator expectation for acceleration upon detection of an operator acceleration intention. In this case, correction to increase the accelerator pedal reaction force makes it possible to restrain driving force from increasing too much to maintain appropriate balance.

In the first and second exemplary embodiments, the driving operation assisting system causes the repulsive force Fc and accelerator pedal reaction force instruction value FA to increase linearly with the risk potential RP, as shown in FIGS. 12 and 18. The present disclosure is not limited to this kind of setting. Another possible setting is that the repulsive force Fc and accelerator pedal reaction force instruction value FA increase exponentially relative to the risk potential RP.

In the first and second exemplary embodiments, the laser radar 10 and vehicle speed sensor 20 perform the function of an obstacle detecting device. The risk potential calculation device 52 performs the function of risk potential calculating device. The accelerator pedal stroke sensor 64 performs the function of an accelerator pedal operation amount detecting device. Braking and driving force correction amounts calculation device 57 performs the function of a driving torque correcting means and the function of an adjustment time setting device. The driving force regulator 63 performs the function of a driving force regulating means. The accelerator manipulation speed dependent driving force calculation device 55 performs the function of an acceleration estimating device. The driving force regulator 63 performs the function of an acceleration change generating device. The in-driving-operation reaction force correction device 56 performs the function of an in-driving-operation reaction force correcting device and the function of an in-driving-operation correction time setting device. The present disclosure is not limited to this example. For example, in the obstacle detecting device, the laser radar 10 may be replaced with another type like millimeter-wave radar.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. A system for assisting a driver who steps on an accelerator pedal to control a driving force generated by an engine of a vehicle, comprising:
    an obstacle detecting device configured to obtain data related to an obstacle in a field around the vehicle;
    an accelerator pedal stroke sensor configured to detect an operation amount of the accelerator pedal;
    an accelerator pedal reaction force regulator configured to regulate a reaction force applied to the driver from the accelerator pedal in response to a reaction force command;
    a driving force regulator configured to:
        calculate a driver driving-force request based on the detected operation amount of the accelerator pedal using a predetermined relationship between a driver driving-force request and an operation amount of the accelerator pedal;
        subtract a driving force command from the calculated driver driving-force request to give a target driving force; and
        control the internal combustion engine in such a way that the target driving force is generated; and
    a controller configured to:
        recognize an obstacle situation based on the obtained data and calculate risk potential based on the recognized obstacle situation;
        calculate an accelerator pedal reaction force instruction value based on the calculated risk potential using a predetermined relationship between the risk potential and the reaction force instruction value;
        calculate a manipulation speed of the accelerator pedal;
        determine, based on the detected operation amount of the accelerator pedal and the calculated manipulation speed of the accelerator pedal, that the driver issues an acceleration intention via the accelerator pedal when the driver steps on the acceleration pedal at a manipulation speed greater than or equal to a predetermined value;
        calculate an accelerator pedal reaction force correction amount based on the calculated accelerator pedal reaction force instruction value;
        provide the calculated accelerator pedal reaction force correction amount, as the reaction force command, to the accelerator pedal reaction force regulator;
        calculate a driving force correction amount based on the calculated risk potential; and
        provide the calculated driving force correction amount, as the driving force command, to the driving force regulator,
    wherein the calculated driving force correction amount is reduced in response to the calculated manipulation speed of the accelerator pedal for a predetermined period of time upon determining that the driver issues the acceleration intention and the calculated driving force correction amount remains unaltered upon determining that the driver does not issue the acceleration intention, and
    wherein the calculated accelerator pedal reaction force correction amount is a product of the calculated accelerator pedal reaction force instruction value and a reaction force correction coefficient that takes a different value upon determining that the driver issues the acceleration intention from a value upon determining that the driver does not use the acceleration intention.

2. The system as claimed in claim 1, wherein the calculated driving force correction amount includes a repulsive force that is calculated based on the calculated risk potential using a predetermined relationship between the risk potential and the repulsive force.

3. The system as claimed in claim 2, wherein the calculated driving force correction amount includes an accelerator manipulation speed dependent driving force that is zero when the calculated manipulation speed is less than the predetermined value and increases from zero as the calculated manipulation speed increases when the calculated manipulation speed is greater than or equal to the predetermined value.

4. The system as claimed in claim 3, wherein the calculated driving force correction amount is given by subtracting the accelerator manipulation speed dependent driving force correction amount from the repulsive force.

* * * * *